(12) United States Patent
Spoltore et al.

(10) Patent No.: US 7,248,161 B2
(45) Date of Patent: Jul. 24, 2007

(54) METHOD AND APPARATUS FOR INTERFACING SECURITY SYSTEMS

(75) Inventors: Michael T. Spoltore, Valley Stream, NY (US); Robert J. Orlando, Nesconset, NY (US); Robert S. Adonailo, Rockville Centre, NY (US); Scott Simon, Melville, NY (US); Gordon Hope, Miller Place, NY (US)

(73) Assignee: Honeywell International, Inc., Morristown, NJ (US)

( * ) Notice: Subject to any disclaimer, the term of this patent is extended or adjusted under 35 U.S.C. 154(b) by 105 days.

(21) Appl. No.: 10/844,224

(22) Filed: May 12, 2004

(65) Prior Publication Data

US 2005/0253706 A1    Nov. 17, 2005

(51) Int. Cl.
*G08B 1/08* (2006.01)
(52) U.S. Cl. .......................... 340/539.14; 340/539.17; 340/539.22; 340/506; 340/531; 340/541; 340/825.69
(58) Field of Classification Search ........... 340/539.14, 340/539.13, 539.17, 539.22, 506, 531, 540, 340/541, 545.1, 825.69
See application file for complete search history.

(56) References Cited

U.S. PATENT DOCUMENTS 5,461,372 A * 10/1995 Busak et al. ............... 340/5.27
6,433,683 B1 * 8/2002 Robinson .................... 340/540
6,661,340 B1 * 12/2003 Saylor et al. ............... 340/517

2003/0117280 A1 * 6/2003 Prehn
2003/0184436 A1 * 10/2003 Seales et al.

OTHER PUBLICATIONS

"Remote Control for Your Home's Heating/Cooling System", Honeywell: Comfort, Energy & Health Solutions, Jun. 2001, printed Apr. 8, 2004 from http://content.honeywell.com/yourhome/tan/tam.asp.
"Honeywell Home Controller Gateway™"; printed Apr. 8, 2004 from http://www.eadhome.nl/producten/domotica/honeywell_convenience/honeywell_home_controller_gatewa.html.
W7006A Home Controller Gateway User Guide, Jul. 2001, printed Apr. 8, 2004 from: http://content.honeywell.com/yourhome/ac_automated_controllcentralized_intro.htm.

* cited by examiner

*Primary Examiner*—Hung Nguyen
(74) *Attorney, Agent, or Firm*—Scully, Scott, Murphy & Presser, P.C.

(57) ABSTRACT

Security systems, such as in a home or other building, are interfaced with one another so that alarm messages and other information regarding a first security system are communicated to a second security system. In response, a user at the second system can send commands to the first system, such as for arming or disarming the first system. A user interface device at the second system includes an output component, such as a display screen, for displaying alarm messages from both the first and second systems. Other information, such as video and audio data from the first system, can also be provided at the second system. An input component, such as a keypad, allows the user to enter commands for controlling both the first and second systems. Communication between the security systems may be realized via an RF link, telephone link, and/or computer network.

22 Claims, 3 Drawing Sheets

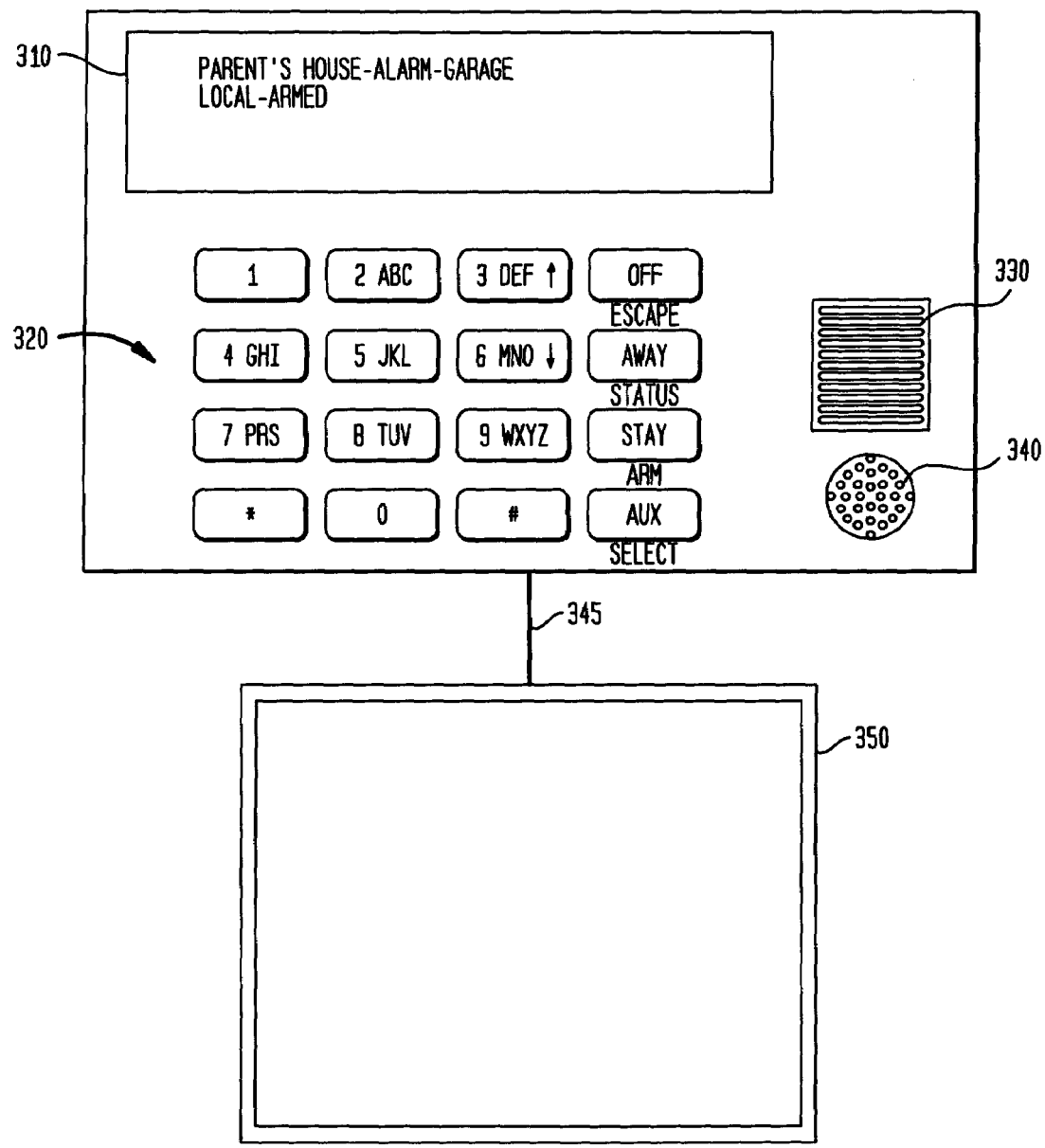

METHOD AND APPARATUS FOR INTERFACING SECURITY SYSTEMS

BACKGROUND OF THE INVENTION

1. Field of Invention

The invention relates generally to security systems and, more particularly, to interfacing security systems so that they communicate with one another.

2. Description of Related Art

Security systems, such as for homes and businesses, have become commonplace as people seek to protect themselves and their property. Security systems typically employ sensors at entry points, such as windows and doors, along with interior sensors such as motion detectors and glass break detectors. The user arms and disarms the system typically by entering a password on a keypad. In addition to sounding a local alarm, the security system may include a telephone dialer for informing a remote monitoring station of an alarm condition.

However, there is a need for a convenient way to provide the user with information regarding a security system, and to enable the user to control the security system, when the user is not present at the location that is secured by the system.

BRIEF SUMMARY OF THE INVENTION

The present invention describes a solution that allows security systems to interface with one another.

In one aspect of the invention, a security apparatus includes a user interface device in a first security system, where the first security system secures a first building location. The user interface device includes at least one user output component for providing information regarding the first security system, such as alarm status information, video or audio data of the first building location, or the like. A receiver is provided for receiving data from a second security system, where the second security system secures a second building location different than the first building location. The at least one user output component is responsive to the received data for providing information regarding the second security system, such as alarm status information, video or audio data of the second building location, or the like.

In another aspect of the invention, a security apparatus includes a user interface device in a first security system, where the first security system secures a first building location, and a transmitter for transmitting first data to a second security system, where the second security system secures a second building location different than the first building location. The first data provides information regarding the first security system. A receiver is provided for receiving second data from the second security system following the transmitting of the first data thereto. The second data indicates a command for controlling the first security system.

BRIEF DESCRIPTION OF THE DRAWINGS

These and other features, benefits and advantages of the present invention will become apparent by reference to the following text and figures, with like reference numbers referring to like structures across the views, wherein:

FIG. 3 illustrates an example user interface, according to the invention.

DETAILED DESCRIPTION OF THE INVENTION

Figure 1:
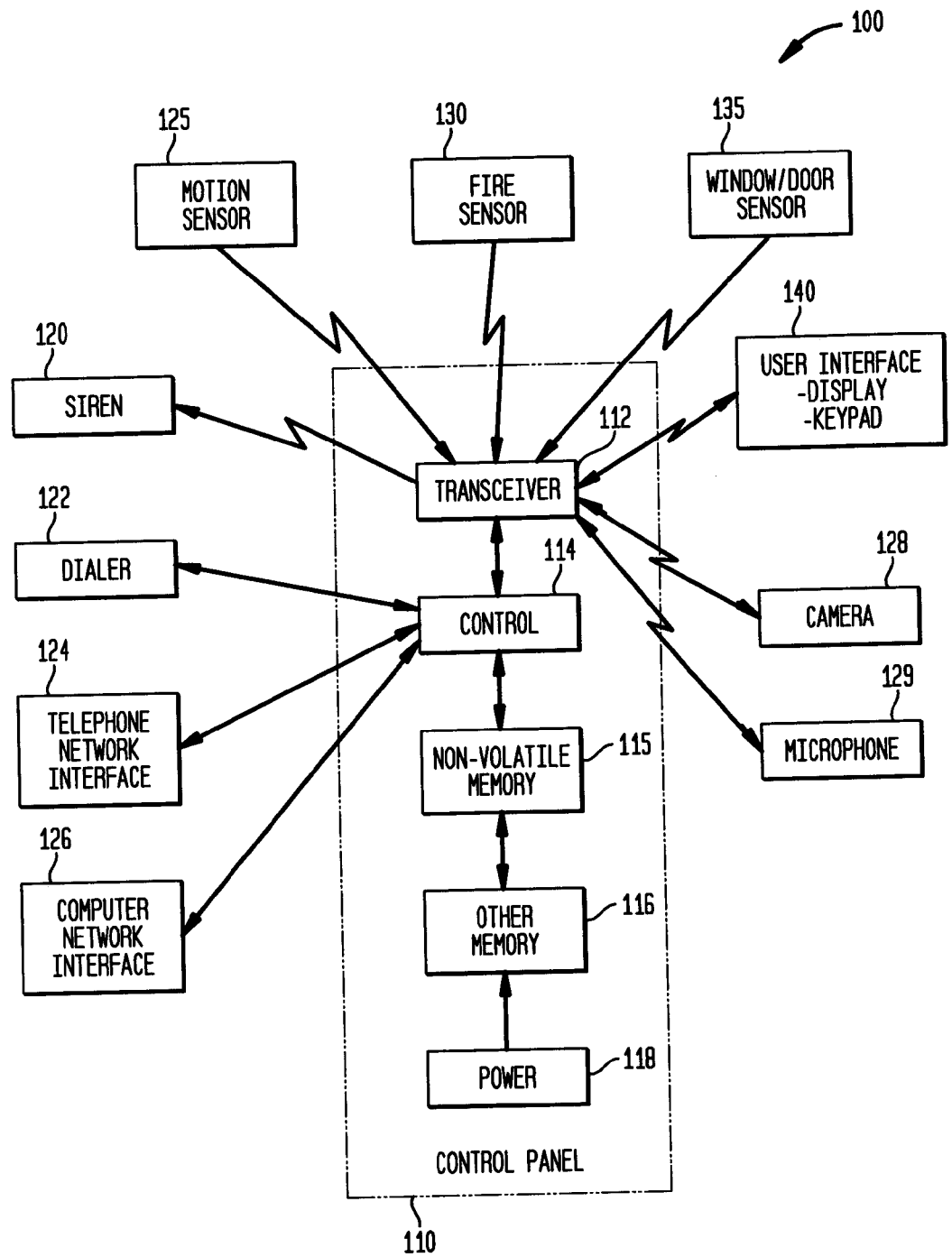
FIG. 1 illustrates an overview of an example security system, according to the invention.

FIG. 1 illustrates an overview of an example security system, according to the invention. Many buildings such as homes and small businesses today are equipped with security systems to secure the buildings, e.g., by deterring burglaries and detecting fires or noxious fumes such as carbon monoxide. An example security system 100 includes a central control panel 110 that communicates with a number of sensors via a wired or wireless path. For example, the control panel 110 may receive signals from motion sensors 125 that detect when a person enters a room. Signals received from fire sensors 130 indicate that a fire has been detected. Signals received from window and door sensors 135 indicate that a window or door has been opened.

Signals received from a peripheral user interface device 140, such as a keypad and display, a combined display and touch screen, and/or a voice interface, may arm and disarm the system. The user interface device 140 may be the primary interface between the human user and the security system 100. The user interface device 140 typically includes components that are analogous to the control panel 110, including a control, memory and power source. Optionally, the user interface device 140 includes a transceiver (transmitter and receiver). The user interface device 140 is commonly provided as a wireless device to allow it to be permanently installed in the home without running wire, such as by affixing it to a wall or placing it on a table, for instance. Moreover, multiple user interface devices may be provided in a home, such as in different rooms. The control panel 110 generally is a larger component that may be installed in an unobtrusive location in the home, such as a closet or basement. However, it is not necessary for the user interface device 140 to be separate from the control panel 110, or to communicate by wireless signals with the control panel 110. For example, the user interface device 140 may be integrated into the control panel 110.

Various other components may communicate with the control panel 110, such as a wireless key fob/panic button that is used to trip an alarm. The control panel 110 may also transmit signals to components of the security system 100. For example, signals may be transmitted to a siren 120 to activate the siren when an alarm condition is detected. Signals may be sent to the user interface device 140 to display status information to the user, such as whether the system is armed or disarmed, whether a specific door or window has been opened, and, when the system is armed, whether an alarm has been tripped. The control panel 110 may also have the ability to notify local emergency services and/or a remote monitoring station of an alarm condition via a telephone dialer 122. Furthermore, a telephone network interface 124, such as a modem, allows the control panel 110 to send and receive information via a telephone link. The functionality of the dialer 122 may be combined into the interface 124. A computer network interface 126 allows the control panel 110 to send and receive information via a computer network, such as the Internet. The computer network interface 126 may include an always-on interface, such as a DSL or cable modem, and a network interface card, for example. Or, a dial-up telephone connection may be used. Other communication paths such as long-range radio and a cellular telephone link may also be used. The dialer 122 and interfaces 124 and 126 are typically hardwired to the control panel 110 and activated by the control 114.

One or more cameras 128 may be used to provide image data to the control 114 directly or via the transceiver 112. For example, various cameras known in the art provide still images every few seconds. Motion images can also be obtained. The image data is encoded and compressed for storage and/or transmission in a digital format. An appropriate storage medium such as a hard disk can be used to store the image data. The cameras can be positioned at various locations around the home or other secured location, including the exterior and interior. When an alarm occurs, image data from the camera that has a view of the area monitored by the sensor that tripped the alarm can be stored and communicated to a monitoring station and/or to a remote security system as discussed herein for remote viewing. Similarly, one or more microphones 129 can provide audio data from different locations around the secured premises to the control 114 directly or via the transceiver 112. When an alarm occurs, audio data from the microphones that cover an area monitored by the sensor that tripped the alarm can be stored and communicated to a monitoring station and/or to a remote security system as discussed herein for remote listening. If an alarm is triggered, e.g., by a panic button on a key fob rather than by a sensor in a specific zone of the secured building, all video and/or image data can be communicated to the remote location.

It is also possible for the second, remote security system to send commands to the first security system to control the cameras and microphones. For example, a camera may be mounted so that it can change its field of view, such as by zooming in or pivoting, via a motor control. In this case, such movement can be controlled remotely using an appropriate control and communication scheme. It is also possible to change the operating mode of a camera, such as by changing the rate or resolution at which it provides still frames, or switching from a still frame mode to a motion picture mode, or switching from a visible light mode to an infrared light mode, and so forth.

To facilitate installation and avoid the need to install wiring in a home, wireless security system components may be employed. Some components only transmit or receive. For example, the motion sensors 125, fire sensors 130, and window and door sensors 135 typically only transmit back to the control panel 110 when they are tripped, while the siren 120 only receives a signal from the control panel 110 when the control panel 110 detects an alarm condition based on a signal received from one of the sensors. The user interface device 140 may have both transmit and receive capabilities to communicate with the control panel 110. The wireless security system components may use radio frequency (RF) signals. One system uses signals at 345 MHz to provide a nominal indoor range of 200 feet and an outdoor range of up to one mile. Different manufacturers may use different proprietary schemes for communicating data. For example, different coding and modulation techniques may be used. Components provided by Honeywell Corp. may advantageously be used.

The control panel 110 includes a transceiver 112 for transmitting and receiving wireless signals. The control 114 includes a microprocessor that may execute software, firmware, micro-code or the like to implement logic to control the security system 100. The control panel 110 may include a non-volatile memory 115 and other additional memory 116 as required. A memory resource used for storing software or other instructions that are executed by the control 114 to achieve the functionality described herein may be considered a program storage device. A dedicated chip such as an ASIC may also be used. Generally, each wireless component of the security system must be "learned" by the control 114. In the learning process, data is stored in the non-volatile memory 115 that identifies the characteristics of each sensor, including the sensor type, serial number or other code or identifier, and what type of action to take based on signals received from each sensor. For example, the action may be to provide a status message to the user, store data for subsequent maintenance purposes, or trip an alarm. A power source 118 provides power to the control panel 110 and typically includes a battery backup to AC power.

The present inventors have determined that an existing security system can be modified to communicate with one or more other security systems, e.g., to display information regarding the other security systems, such as alarm status information, audio and video data, and the like, and provide commands to the other security systems. In one approach, existing communication components and transmitting and receiving protocols of the control panel 110 and/or user interface device 140 can be used. The appropriate control logic can be implemented as the control panel 110 and/or user interface device 140 are upgraded. Communication interfaces can be added as needed, such as interfaces 124 and 126, if they are not already present.

The functionality provided by the invention has many advantages. For example, the user has the ability to monitor and control another alarm system from another location, such as their home or business, regardless of whether the security system is nearby or far away. The user can also monitor video and audio data of a remote location. In one possible approach, a user interface of the user's local security system, which may be at the user's home, for instance, is used to monitor and control a second security system located at another location, such as a second home, e.g., a rental or vacation home, or the user's business location, such as a retail shop, office, warehouse or factory. Information is made available to the user regarding the second location, via a push approach, including alarm status information that indicates, e.g., whether an alarm has been set, when the alarm was set, whether the alarm is an intrusion alarm, fire alarm, noxious gas alarm, or other type, and other information such as an alert that the system has a malfunction or requires maintenance. Further detailed information regarding an alarm may also be accessed. For instance, for an intrusion alarm, the user may be provided information regarding the source of the alarm, such as which zone in a building has triggered the alarm, the type of sensor that has been tripped (window, door, motion, etc.), or whether a panic button has triggered an alarm. The user can send commands to the second security system to control the system, e.g., to arm or disarm the system, set a bypass mode, and so forth. The bypass mode may be used to disable a sensor or zone in the secured building location that is triggering false alarms, for instance.

In one example scenario, a user arms the alarm system in the user's business and goes home for the evening. An intruder enters the business and triggers an alarm. A local alarm is set at the business location, e.g., by activating a local siren, and, optionally, notifying a remote monitoring station via the telephone dialer 122. Additionally, according to the invention, the security system at the business location transmits data to the security system at the user's home informing the user of the alarm and providing information such as video and audio data from the business location. The user interface at the user's home can provide an audible and/or visual message regarding the alarm to alert the user. In response to learning of the alarm, the user may take an action such as telephoning a night watchman at the business to inquire as to whether the alarm is a false alarm, for instance. The user can also monitor camera and audio data of the business location to determine if there is foul play. If the alarm is a false alarm, the user can disarm the security system, such as by entering a key press sequence at the local user interface, causing a command to be sent to the security system at the business location for disarming the security system. Advantageously, the user need not travel back to the business location to disarm the system, and need not disclose the code for disarming the system to others. Furthermore, the alarm message or other information such as maintenance messages, audio and video data, can be stored in memory at the user' home security system for later retrieval, e.g., if the user is not present in the home. An additional action may be automatically taken by the user's home security system as well, such as paging the user or sending a message to the user by cell phone or telephone, if the user does not acknowledge the alarm message, such as by entering a key press sequence on the user interface.

In another example, the user is at the business location, and an alarm message is received from the home security system. In this case, the user interface at the business location alerts the user to the alarm. The user can view the alarm status information and take an action to remotely control the home alarm system. For example, the user can enter a key press sequence that causes a command to be sent to the home security system.

In another example, the user is the caregiver of a senior citizen. In this case, the security system at the senior's location communicates with the security system of the caregiver, e.g., at the caregiver's home or business location. The caregiver is thus always apprised of any alarm conditions at the senior's location and can take an appropriate action. Note that the security system at the senior's location can be configured to communicate a message even when the system is not armed. For instance, the security system can communicate a message indicating that a door has been opened. This may be desirable, e.g., to notify the caregiver that an absent minded senior may have left the home. The user can then telephone a neighbor to ask them to check on the senior, for instance, or view video data from the entrance to the home to determine what has occurred. As a further example, the senior's security system can communicate a message to the caregiver indicating that the senior's home has fallen below a certain temperature. A message can also be triggered if the senior activates a panic button.

In another example, the user is the parent of a school aged child. In this case, the home security system communicates with the security system of the parent to inform the parent when the child has returned home from school, e.g., based on detecting that the door of the home has opened, or by detecting that the home alarm was disarmed or armed by the child. Video data can also be provided to allow the parent to monitor the child's activities.

Other conditions in or around a home, such as a flooded basement, can similarly be reported, by providing the security system with appropriate sensors. Equipment used by a person undergoing a medical treatment may be monitored. For instance, using an appropriate sensor and interface to the security system, data from a heart monitor can be communicated. The data can be reported on a periodic basis, or when an irregularity is detected, such as an irregular heartbeat.

In another example use, the user is visiting with a trusted neighbor. In this case, the user's security system communicates with the neighbor's security system via an RF link, if within range. The user is thus always apprised of any alarm conditions at the user's home, or other activity such as an opened door, and can take an appropriate action.

Advantageously, by communicating information via the existing security system components, there is no, or minimal, need for additional equipment in the secured location. Disruption to the home due to installing additional components and wires, for example, is minimal or nonexistent. Features of the existing security system, such a backup power and central station monitoring, are maintained and leveraged with a security system according to the invention.

Figure 2:
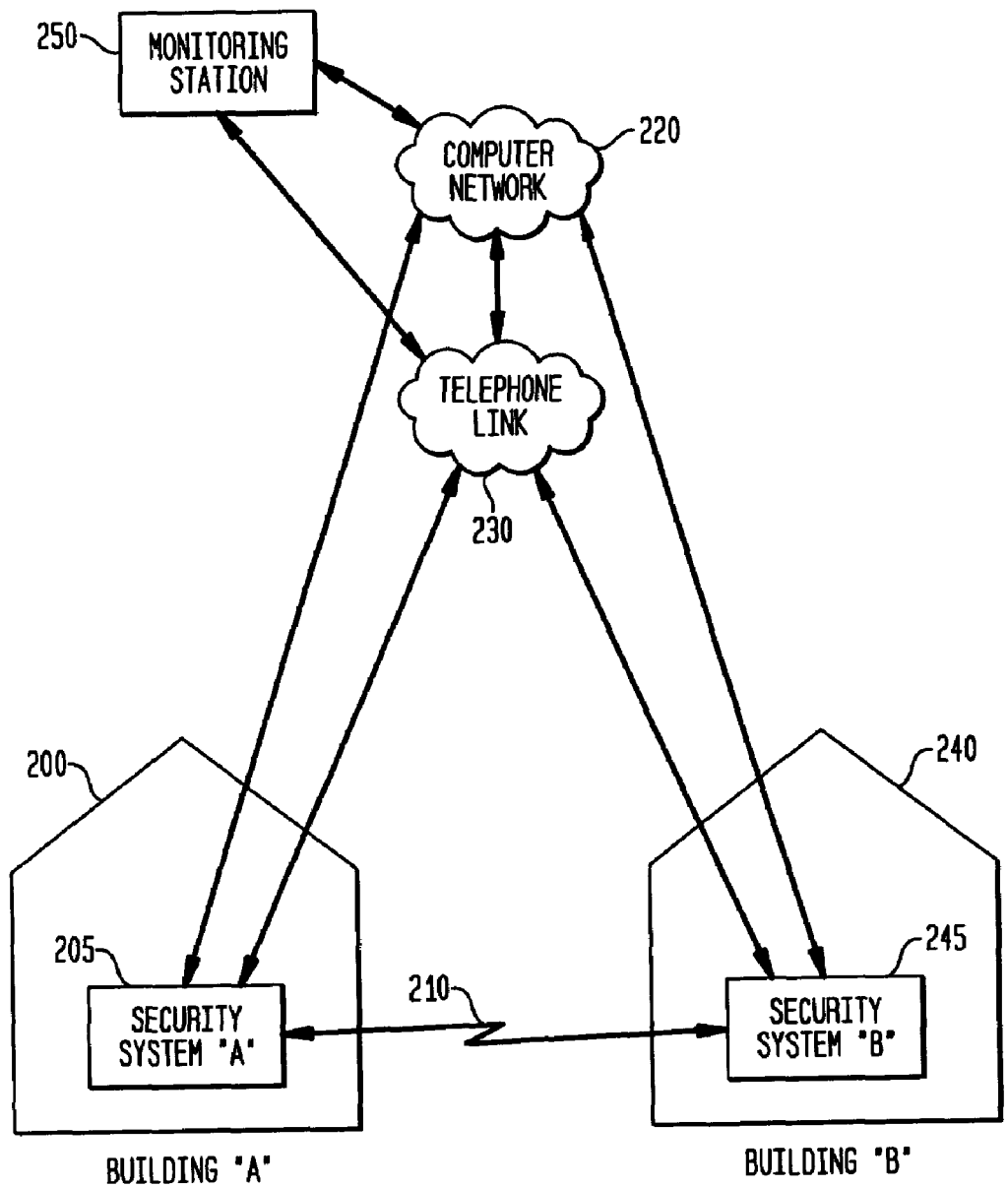
FIG. 2 illustrates two security systems communicating with one another, according to the invention.

FIG. 2 illustrates two security systems communicating with one another, according o the invention. A first building location (building "A") 200 is secured by a first security system (security system "A") 205, while a second building location (building "B") 240 is secured by a second security system (security system "B") 245. The building locations may be separate structures, such as individual homes or business facilities. Or, the building locations may be different parts of a common structure, such as different apartments in an apartment building, or the lower and upper levels of a house, for instance. Note that the concept can be extended to more than two security systems and building locations. Moreover, communication between security systems needed not be bi-directional. Thus, the invention encompasses a scenario where the first security system 205 transmits information such as alarm messages to the second security system 245, but the second security system 245 does not have the ability to transmit data such as commands to the first security system. Furthermore, in this case, the second security system 245 need not transmit alarm messages or other information to the first security system 205. However, bi-directional communication, where each security system has similar transmit and receive capabilities, is also encompassed.

Communication between the security systems 205 and 245 can be achieved in different ways. If the building locations 200 and 240 are sufficiently close, communication may be achieved using a direct RF wireless path 210 or RF pipeline. For instance, the existing transceiver 112 (FIG. 1) of a security system may be used. Such a transceiver may be in place to transmit signals to wireless components, such as a wireless siren 120 and peripheral user interface 140, as discussed previously. If the range of the existing transmitter in the transceiver 112 is not sufficient, a separate higher-powered transmitter may be used. Such a transmitter with its antenna can be located advantageously about the building, such as in an attic or on a rooftop, to ensure the desired range. An upgraded receiver and antenna at the receiving location may similarly be used. RF signaling has the advantage that a telephone line or computer network connection is not used. These communication paths thus remain free to report an alarm to a monitoring station or allow a person to speak on the phone or access a computer network, for instance.

In another approach, the security systems 205 and 245 use a telephone link 230, such as a conventional telephone network, to communicate with one another. In this case, signaling using a compatible modem may be used. Any known communication technique may be used. This approach has the advantage that a computer network or RF channel is not used. See the previous discussion regarding the telephone network interface 124.

In another approach, the security systems 205 and 245 use a computer network 220 such as the Internet to communicate. For instance, the security systems 205 and 245 may use a communications protocol such as TCP/IP to communicate with one another via the computer network 220. This approach has the advantage that a telephone link or RF channel is not used. See the previous discussion regarding the computer network interface 126.

Note that a monitoring station 250 may be used to communicate with the security systems 205 and 245 as well. For instance, alarm messages can be reported to the monitoring station 250, e.g., via the telephone link 230 or the computer network 220. The monitoring station 250 may also transmit data to the security systems 205 and 245, such as software that is downloaded by the security systems 205 and 245, to realize new features. Moreover, the monitoring station 250 may relay data between security systems. For instance, if the first security system 205 is not able to transmit data directly to the second security system 245, e.g., due to a malfunction at the second security system 245 or other problem, the first security system 205 may instead, or additionally, transmit the data to the monitoring station 250. The monitoring station 250 can then periodically attempt to contact the second security system 245 to provide the data. This frees the first security system 205 from repeatedly attempting to contact the second security system 245. The communication path used by the first security system 205 therefore is available for other uses.

It is also possible for a security system to use different communication paths for upstream and downstream communications, or to use multiple paths of the same or different type for redundancy. For example, the first security system 205 may transmit data to the second security system 245 via the telephone link 230, while receiving data from the second security system 245 via the computer network 220. Or, the different communication paths may be attempted serially until a successful communication is made. To this end, the transmitting security system may wait until it receives a confirmation from the receiving security system that a transmitted message has been successfully received. If no confirmation is received, a next communication channel is tried.

FIG. 3 illustrates an example user interface, according to the invention. As mentioned, the user interface device 140 can be provided, e.g., as a peripheral to, or a part of, the main control panel 110. The exact arrangement of components is transparent to the user. Thus, the functionality that is described herein as being provided by a user interface device may be provided wholly locally to the device 140, or partially remotely, such as at the associated control panel 110. The user interface device 140 includes a user input component such as a keypad 320 and/or microphone 340 for speech recognition in a voice-activated system, and a user output component such as a display 310 and/or speaker 330. In one approach, a touch screen is used where the keypad 320 or other icons are on a display. The display 310 may be a multi-line, multi-character LCD display, for instance. The display 310 can provide a graphic device such as a cursor or other highlight to allow the user to select a particular function using a "select" key to obtain additional information or options. A separate display 350 coupled via a link 345 may be used to display video data from the remote security system. The speaker 330 may play audio data from the remote security system. In the example shown, the display 310 indicates that an alarm has been set at a security system for a first building location identified as "parent's house", and that the sensor that triggered the alarm is in the garage. The display 350 may provide an image of the garage. The display 310 further indicates that a security system is armed in a second building location identified as "local", e.g., the location in which the user interface device 140 is provided.

Advantageously, the user interface device 140 may be of the type that is used for controlling a home security system so no re-design, e.g., to provide additional keys on the keypad 320, is necessary. In particular, functions can be assigned to existing keys to accommodate the functionality of the present invention. Each key can have more than one function as well by employing double function or soft keys. In one possible example, the "off" key has the additional function of "escape", the "away" key has the additional function of "status", the "stay" key has the additional function of "arm", and the "aux" or auxiliary key has the additional function of "select". Each of the additional functions can be accessed by pressing a "shift" or "function" key or the like, or by simply entering a specific mode. Optionally, dedicated keys can be provided for specified functions. It is also possible to provide a separate display or a separate user interface device that provides information regarding the remote security system.

Control logic associated with the user interface device 140 allows it to control both the local security system and the one or more remote security systems. Any appropriate menu display scheme and logic may be used. In particular, the user interface device 140 may include a microprocessor that executes software, firmware, micro-code or the like stored in memory, or a dedicated chip such as an ASIC, to control the local and remote security systems. However, the intelligence can be carried out at different locations in the security system 100, such as at the control panel 110 and at one or more peripheral user interface devices 140.

By providing a uniform appearance and functionality among the user interface devices at the different locations that are secured by the different security systems. The user can easily learn and use the new features regarding the remote security system monitoring and control.

The user interface device 140 can be configured to operate in various modes. For example, in a manual mode, the home or business owner manually initiates a key sequence at their local home or business user interface. The security system communicates with the remote off-site alarm panel, which answers the incoming call. The two security systems establish a connection, and the user is able to view status information, access audio and video data, and control the remote off-site alarm system from the user's local user interface. All commands such as arming, disarming, and bypassing are available. The monitoring keypad/user interface device may beep, for instance, to provide an alert that there is an alarm at the remote off-site premises. A password protection may be implemented that requires a user to enter a password to view the alarm status of the remote security system and/or control the remote security system.

In an automatic mode, if an alarm or trouble condition occurs at a local site, the local security system can communicate directly with the remote security system to allow the user at the remote site to view status information and control the local security system. When only one communication channel is available to the local security system, the local security system may first report to a central monitoring station, then report to the remote security system. When a telephone link to the central monitoring station is used, for instance, the local security system takes control of the phone line after the central monitoring station releases it.

The user interface device 140 may be configured by the user or installer with the contact information of one or more remote security systems to which it will communicate alarm status information. The configuration information may include, e.g., and IP address, telephone number, or serial number, password or other identifier of the receiving security system. Menu prompts may be displayed on the user interface device 140 to allow the user to identify and configure the one or more remote security systems. Moreover, a user-friendly identifier may be used to identify the location for each security system, such as "parent's house", "Mom's shop", "Dad's office", "Grandma's house" and so forth.

Regarding an alarm/trouble condition, a separate bit option may be used that defines whether the security system will support sharing of alarm/trouble information with another security system. If this option is set, all alarm and trouble information will be shared with the one or more other security system and displayed on their user interfaces. This allows a security system to be alerted to specific information regarding remote alarms and trouble notifications from another security system. If the option is set, a connection to the other security system is established and all commands and features are functional.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A security apparatus, comprising:
 a user interface device in a first security system, the first security system securing a first building location; the user interface device including at least one user output component for providing information regarding the first security system; and
 a receiver for receiving data from a second security system, the second security system securing a second building location different than the first building location;
 a transmitter for transmitting control data to the second security system for controlling the second security system;
 wherein the at least one user output component is responsive to the received data for providing information regarding the second security system.

2. The security apparatus of claim 1, wherein: the receiver comprises an RF receiver for receiving the data from the second security system.

3. The security apparatus of claim 1, wherein: the receiver comprises an interface to a telephone link for receiving the data from the second security system.

4. The security apparatus of claim 1, wherein: the receiver comprises an interface to a computer network for receiving the data from the second security system.

5. The security apparatus of claim 1, wherein: the information regarding the first security system comprises an alarm status of the first security system.

6. The security apparatus of claim 1, wherein: the information regarding the second security system comprises an alarm status of the second security system.

7. The security apparatus of claim 1, wherein: the information regarding the second security system comprises video data of the second security system.

8. The security apparatus of claim 1, wherein: the information regarding the second security system comprises audio data of the second security system.

9. The security apparatus of claim 1, wherein: the information regarding the second security system indicates a zone in the second building location that has triggered an alarm in the second security system.

10. The security apparatus of claim 1, wherein: the transmitter comprises an RF transmitter for transmitting the control data to the second security system.

11. The security apparatus of claim 1, wherein: the transmitter comprises an interface to a telephone link for transmitting the control data to the second security system.

12. The security apparatus of claim 1, wherein: the transmitter comprises an interface to a computer network for transmitting the control data to the second security system.

13. The security apparatus of claim 1, wherein: the control data causes at least one of arming and disarming of the second security system.

14. The security apparatus of claim 1, wherein: the user interface device includes at least one user input component for receiving a first user command for controlling the first security system, and a second user command for controlling the second security system, the second user command being manually provided by a user in response to the at least one user output component displaying the information regarding the second security system; and the transmitter transmits the control data to the second security system for controlling the second security system responsive to the second user command.

15. A security apparatus, comprising:
- a user interface device in a first security system, the first security system securing a first building location;
- a transmitter for transmitting first data to a second security system, the second security system securing a second building location different than the first building location;
- the first data providing information regarding the first security system; and
- a receiver for receiving second data from the second security system following the transmitting of the first data thereto;
- wherein the second data indicates a command for controlling the first security system.

16. The security apparatus of claim 15, wherein: the transmitter comprises an RF transmitter for transmitting the first data to the second security system.

17. The security apparatus of claim 15, wherein: the transmitter comprises an interface to a telephone link for transmitting the first data to the second security system.

18. The security apparatus of claim 15, wherein: the transmitter comprises an interface to a computer network for transmitting the first data to the second security system.

19. The security apparatus of claim 15, wherein: the receiver comprises an RF receiver for receiving the second data from the second security system.

20. The security apparatus of claim 15, wherein: the receiver comprises an interface to a telephone link for receiving the second data from the second security system.

21. The security apparatus of claim 15, wherein: the receiver comprises an interface to a computer network for receiving the second data from the second security system.

22. A method for securing a first building location and a second building location different than the first building location, comprising:
- displaying information regarding a first security system, via at least one user output component of a user interface device in a first security system; the first security system securing the first building location;
- receiving data from a second security system, the second security system securing the second building location;
- transmitting control data to the second security system for controlling the second security system; and
- displaying information regarding the second security system via the at least one user output component responsive to the received data.

* * * * *